UNITED STATES PATENT OFFICE.

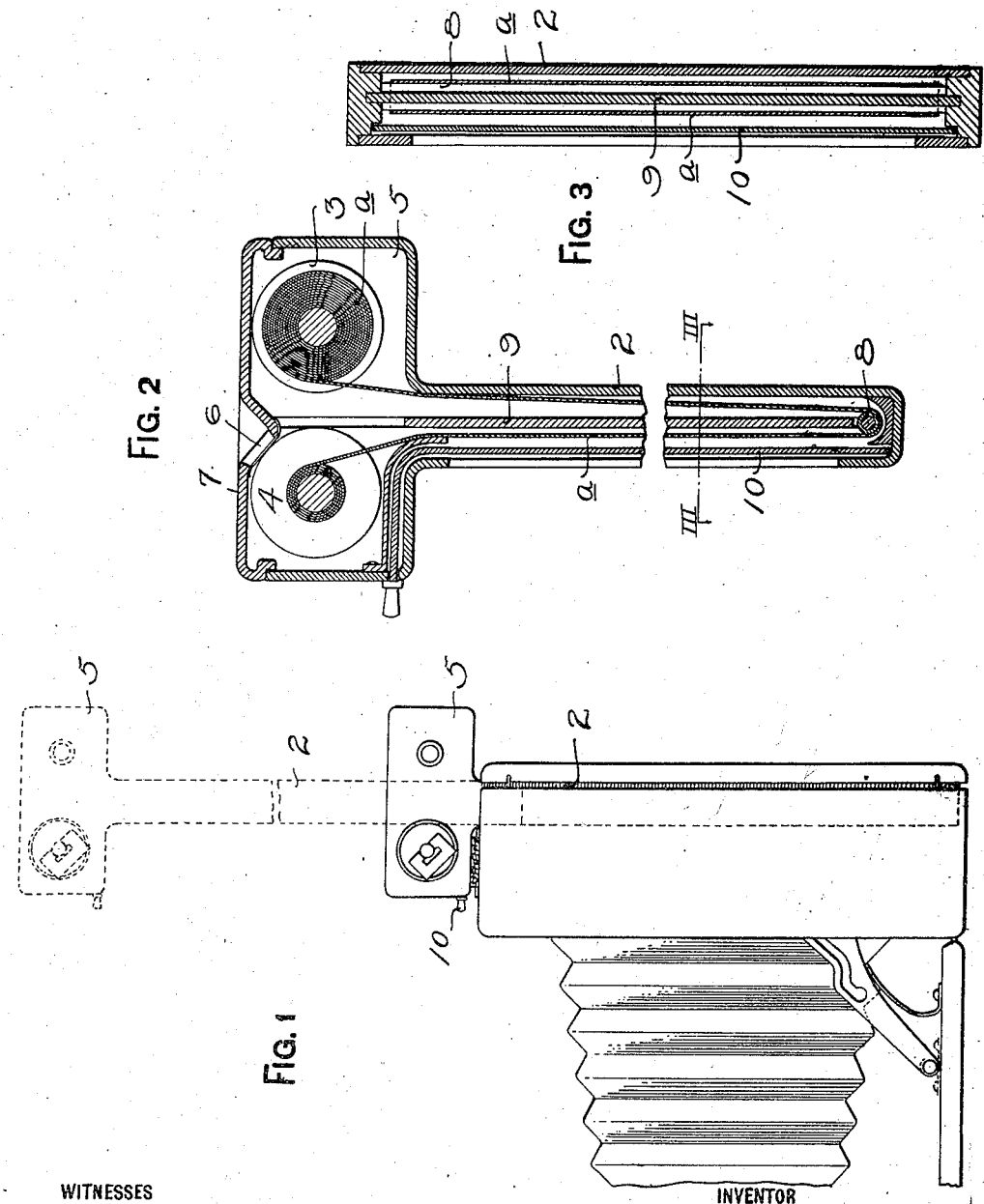

ANDREW MARTIN VALE, OF SHERIDANVILLE, PENNSYLVANIA, ASSIGNOR OF ONE-HALF TO JOSEPH C. GREINER, OF PITTSBURG, PENNSYLVANIA.

FILM ATTACHMENT FOR CAMERAS.

968,716.  Specification of Letters Patent.  Patented Aug. 30, 1910.

Application filed April 12, 1909. Serial No. 489,491.

*To all whom it may concern:*

Be it known that I, ANDREW M. VALE, of Sheridanville, in the county of Allegheny and State of Pennsylvania, have invented a certain new and useful Improvement in Film Attachments for Cameras, of which the following is a full, clear, and exact description.

This invention relates to film attachment for cameras and its primary object is to provide means for the application of a film to a camera employing a ground glass or similar focusing screen; it being a well known fact that the construction of the ordinary film camera is such as to preclude the possibility of focusing through the lens on a screen at the rear of the camera, as in the ordinary plate camera.

I shall now describe my invention so that others skilled in the art to which it appertains may understand and construct the same, reference being had to the accompanying drawings forming part of this specification and in which—

Figure 1 is a side elevation illustrating my invention in connection with a camera; Fig. 2 is an enlarged vertical sectional view; and Fig. 3 is a transverse sectional view on the line III—III of Fig. 2.

In describing my invention, the reference numeral 2 indicates the film carrying frame which, in general appearance, is similar to and is adapted to be received by the camera in the same manner as the ordinary plate-holder of a plate camera. Through this frame the film *a* is adapted to be intermittently fed from the film delivery spool 3 to the take-up spool 4 mounted in the chamber 5 at one end of the frame. The film delivery and take-up spools 3 and 4 may be mounted so as to be interchangeable as in the ordinary film camera. It will be noted that the film spools are disposed on opposite sides of the frame 2. By this arrangement a standard film may be employed as the film is caused to be received by the take-up spool 4 with the sensitized face thereof turned toward the spool, the result of which is that the film numbers carried by the back face of the film may be readily determined as they pass to the take-up spool. The aperture by means of which the film numbers may be ascertained as the film is caused to pass from the delivery to the take-up spool, is carried by the cover 7 of the chamber 5. This aperture is covered with the usual non-actinic strip and is indicated by the numeral 6. Carried by the forward end of the frame 2 is the film guiding roller 8 around which the film passes from the delivery to the take-up reel. A partition 9 extending longitudinally of the frame 2 separates the incoming from the outgoing portion of the film, and completes the arrangement. Light, incident to the exposure of the forward portion of the film, is prevented by this partition from reaching the incoming film at the back of the frame. The shutter 10, the office of which is the same as that of the slide or shutter of a plate-holder, is shown as entering the frame 2 through the chamber 5 but I do not desire to limit myself to this precise arrangement.

The operation of my device will be readily understood. Assuming that the film *a* is threaded from the delivery spool through the frame 2, passing around the roller 8, to the take-up spool 4 and that the shutter 10 is in its closed position, the frame 2 may be inserted in the camera, occupying the same position as in the case of an ordinary plate-holder. Should it be desired to focus the camera by means of a rear screen, the frame 2 is caused to be withdrawn from the camera to permit of such focusing, in the manner shown by the dotted lines in Fig. 1. By means of the shutter or slide 10 focusing may be done between each exposure.

The advantages of my invention will be found to reside not only in the fact that an ordinary plate-camera may be readily converted into a film camera but that focusing by means of a ground glass or similar screen may be done in connection with such film application.

Many changes may be made in the construction without departing from my invention.

The device is small and compact and when applied to a camera is symmetrical in appearance.

Having thus described my invention, what I claim and desire to secure by Letters Patent is:

1. In a device of the character described, a delivery frame adapted to be slidingly received by and present the film to the camera, and having at one end a closed chamber provided with film delivery and take-up spools, the spools being disposed substantially on opposite sides of the delivery frame, as set forth.

2. In a device of the character described, a delivery frame adapted to be slidingly received by and present the film to the camera, and having at one end a closed chamber adapted to detachably receive delivery and take-up spools whereby the film is caused to be fed to the delivery frame, the spools being disposed substantially on opposite sides of the delivery frame, as set forth.

3. In a device of the character described, a delivery frame provided with a shutter and adapted to be slidingly received by and present the film to the camera, and a closed chamber at one end of the frame and provided with delivery and take-up spools whereby the film is caused to be fed to the delivery frame, the spools being disposed substantially on opposite sides of the delivery frame, as set forth.

4. In a device of the character described, a delivery frame provided with a shutter and adapted to be slidingly received by and present the film to the camera, a closed chamber at one end of the frame and adapted to receive the delivery and take-up spools whereby the film is caused to be fed to the delivery frame, which spools are disposed substantially on opposite sides of the delivery frame, and means for guiding the film in its passage through the delivery frame from the delivery to the take-up spool, as set forth.

5. In a device of the character described, a delivery frame provided with a shutter adapted to be slidingly received by and present the film to the camera, closed chamber at one end of the frame and delivery and take-up spools disposed substantially on opposite sides of the delivery frame and contained within the closed chamber and adapted to present the film to the delivery frame, the frame being provided with a partition by means of which the incoming portion of the frame is separated from the outgoing portion, as set forth.

6. In a device of the character described, a delivery frame adapted to be received by and to present the film to the camera, a closed chamber at one end of the frame and provided with delivery and take-up spools whereby the film is caused to be fed to the delivery frame; the spools being disposed substantially on opposite sides of the delivery frame, and a shutter for the delivery frame leading from the closed chamber to the delivery frame.

In testimony whereof, I have hereunto set my hand.

ANDREW MARTIN VALE.

Witnesses:
M. ARTHUR KELLER,
M. A. BARTH.